United States Patent
Ahamed et al.

(10) Patent No.: US 11,987,283 B2
(45) Date of Patent: May 21, 2024

(54) USER ASSISTED CAMERA GENERIC TARGET METHOD FOR AUTOMOTIVE TRAILER FUNCTIONS

(71) Applicant: Continental Automotive Systems, Inc., Auburn Hills, MI (US)

(72) Inventors: Nizar Ahamed, Farmington Hills, MI (US); Abdulwahab Alkeilani, Bloomfield Hills, MI (US); Luis Enrique Guerra Fernandez, Oakleigh (AU)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 35 days.

(21) Appl. No.: 17/247,680

(22) Filed: Dec. 20, 2020

(65) Prior Publication Data
US 2022/0194468 A1    Jun. 23, 2022

(51) Int. Cl.
*B62D 13/06* (2006.01)
*B62D 15/02* (2006.01)

(52) U.S. Cl.
CPC ......... *B62D 13/06* (2013.01); *B62D 15/0275* (2013.01)

(58) Field of Classification Search
CPC .. B62D 13/06; B62D 15/0275; B62D 15/025; B62D 15/0285; B62D 15/027; B60R 1/00; B60R 1/001; B60R 1/002; B60R 1/005; B60R 1/006; B60R 1/008; B60R 1/02; B60R 1/10; B60R 1/12; B60R 1/20; B60R 2300/80; B60R 2300/808; B60R 2300/105; B60R 2300/20; B60R 2300/30; B60R 2300/806; H04N 7/183; H04N 9/3185; H04N 9/3141; H04N 9/3155; H04N 9/3179; H04N 9/3194; G05D 1/0214; G05D 1/0231; G05D 2201/0213; B60W 10/18; B60W 10/20; B60W 30/18036; B60W 50/14; B60W 2050/143; B60W 2050/146; B60W 2300/14; B60W 2420/42;
(Continued)

(56) References Cited

U.S. PATENT DOCUMENTS

| 2012/0185131 A1 | 7/2012 | Headley |
| 2014/0085472 A1 | 3/2014 | Lu et al. |

(Continued)

FOREIGN PATENT DOCUMENTS

| CN | 112776792 A | * | 5/2021 | .............. B60D 1/06 |
| GB | 2554427 A | | 4/2018 | |
| WO | 2017123880 A1 | | 7/2017 | |

OTHER PUBLICATIONS

European Search Report dated May 11, 2022 for the counterpart Euopean Patent Application No. 21210662.9.
(Continued)

*Primary Examiner* — Brian A Zimmerman
*Assistant Examiner* — Anthony D Afrifa-Kyei

(57) ABSTRACT

A vehicle trailer assist system is configured to display a plurality of target areas to a vehicle operator for the vehicle operator to select. The vehicle operator selects a target area on a trailer for tracking and using in determining a relative orientation with the vehicle. The system records selected target area and determines a relative orientation between a trailer and a tow vehicle based on a relative position between the features in the selected target area on the trailer and the tow vehicle.

12 Claims, 5 Drawing Sheets

(58) Field of Classification Search
CPC .......... B60W 2550/10; B60W 2554/00; G01C 21/3623; G01C 21/3664; G01C 21/365; G01C 21/3647; B60Q 1/305; B60Q 1/00; B60Q 1/26; B60Q 1/30; B60Q 1/48; B60Q 1/50; B60Q 2400/50; G03B 21/00; G03B 29/00; G03B 21/2033; G06K 9/00791; G06V 20/56; G08G 1/142
See application file for complete search history.

(56) References Cited

U.S. PATENT DOCUMENTS

| | | |
|---|---|---|
| 2014/0172232 A1* | 6/2014 | Rupp ................. B62D 13/06 701/36 |
| 2014/0200759 A1 | 7/2014 | Lu et al. |
| 2017/0043806 A1 | 2/2017 | Muharemovic et al. |
| 2017/0083773 A1 | 3/2017 | Greenwood et al. |
| 2017/0123431 A1 | 5/2017 | Ghneim et al. |
| 2017/0129403 A1* | 5/2017 | Lavoie ................. B60R 1/00 |
| 2019/0064831 A1* | 2/2019 | Gali ................. B62D 13/06 |
| 2020/0317125 A1 | 10/2020 | Kwon et al. |

OTHER PUBLICATIONS

EP Office Action dated Mar. 17, 2023 of counterpart EP application 21 210 662.9 which claims priority of this application.
European Office Action dated Jul. 19, 2023 of counterpart European Patent Application No. 21 210 662.9 which claims priority of this application.

* cited by examiner

USER ASSISTED CAMERA GENERIC TARGET METHOD FOR AUTOMOTIVE TRAILER FUNCTIONS

TECHNICAL FIELD

The present disclosure relates to driver assist systems for a motor vehicle, and more specifically to a driver assist system for maneuvering a vehicle with an attached trailer.

BACKGROUND

Vehicles may be equipped with a trailer reverse assist system that aids in maneuvering an attached trailer. Such systems may utilize a camera to view the trailer and to obtain a relative orientation of the trailer relative to the vehicle. The relative orientation between the vehicle and trailer is information that is needed to determine how to operate the vehicle to direct the trailer.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A vehicle trailer assist system according to an exemplary embodiment of this disclosure includes, among other possible things, a controller configured to display a plurality of target areas to a vehicle operator, record a vehicle operator selected one of the plurality of target areas and determine a relative orientation between a trailer and a tow vehicle based on a relative position between the selected target area on the trailer and the tow vehicle.

In another example embodiment of the foregoing vehicle trailer assist system, the controller is further configured to recognize the target features from an image captured from a camera disposed on the tow vehicle, highlight the target areas on a display and provide for selection of one of the highlighted target areas on the display.

In another example embodiment of any of the foregoing vehicle trailer assist systems, the display is touch sensitive and the controller is configured to record the selected one of the plurality of target areas responsive to the operator contacting the display at a location corresponding with the highlighted target area.

In another example embodiment of any of the foregoing vehicle trailer assist systems, the display is mounted within a cabin of the vehicle and includes a manually actuated control device configured to cycle between the plurality of target areas shown on the display and to select one of the plurality of target areas shown in the display.

In another example embodiment of any of the foregoing vehicle trailer assist systems, the display is actuatable by a vehicle operator to define a target area around a feature of the image displayed on the display and select the features within the defined target box/area.

In another example embodiment of any of the foregoing vehicle trailer assist systems, the controller is configured to identify potential target features from an image of the trailer and to highlight the identified potential target feature areas for selection by the vehicle operator.

In another example embodiment of any of the foregoing vehicle trailer assist systems, the highlight of the target areas comprises a box disposed on the image visible on the display.

In another example embodiment of any of the foregoing vehicle trailer assist systems, the target boxes are highlighted and the remainder of the image is shown faded out.

In another example embodiment of any of the foregoing vehicle trailer assist systems, a camera and an actuator for steering the vehicle to maneuver the trailer are included with the camera configured to obtain an image of the trailer and target features and to communicate the image of the trailer to the display.

A controller for a vehicle trailer assist system according to another exemplary embodiment of this disclosure includes, among other possible things, a first portion configured to display a plurality of target areas to a vehicle operator, a second portion configured to record a vehicle operator selected one of the plurality of target areas, and a third portion configured to determine a relative orientation between a trailer and a tow vehicle based on a relative position between the features in the selected target area on the trailer and the tow vehicle.

In another example embodiment of the foregoing controller, the first portion is configured to recognize the target features from an image captured from a camera disposed on the tow vehicle.

In another example embodiment of any of the foregoing controllers, the first portion is configured to highlight the target areas on the display and provide for selection of one of the highlighted target features on the display.

In another example embodiment of any of the foregoing controllers, the second portion is configured to receive an input of the vehicle operator responsive to a selection of one of the plurality of target areas.

In another example embodiment of any of the foregoing controllers, a memory portion is included for storing the selected target area for subsequent operation.

A method of operating a vehicle trailer assist system according to yet another exemplary embodiment of this disclosure, includes, among other possible things, displaying a plurality of target areas to a vehicle operator, recording a vehicle operated selected one of the displayed plurality of target areas, and determining a relative orientation between a trailer and a tow vehicle based on a relative position between the features in the selected target area on the trailer and the tow vehicle.

Another example embodiment of the foregoing method includes highlighting the target areas on a display and providing for selection of one of the highlighted target areas on the display.

Another example embodiment of the foregoing method includes providing for selection of one of the highlighted target areas with a manually actuated control device configured to cycle between the plurality of target features shown on the display and for selection of one of the plurality of target areas shown in the display.

Another example embodiment of the foregoing method includes providing for generation of a target box around features shown in the image displayed on the display and selection of the target features within the target box.

Another example embodiment of the foregoing method wherein highlighting of the target features comprises displaying the target features within a box disposed on the image visible on the display or highlighting the target areas and fading out the remainder of the image.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
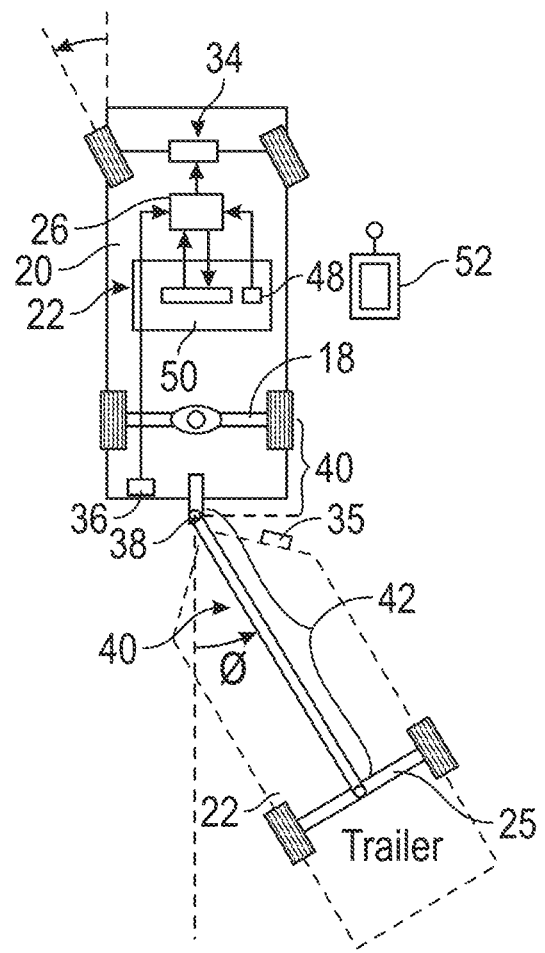
FIG. 1 is a schematic view of a trailer hitched to a vehicle with an example vehicle trailer assist system.

Referring to FIG. 1, a vehicle 20 and trailer 22 are schematically shown hitched together. The vehicle 20 includes a trailer reverse assist system 24 that aids a vehicle operator in steering the trailer 22. It should be appreciated, although an example trailer reverse assist system is disclosed by way of example, other trailer assist systems may benefit from this disclosure. The system 24 provides a vehicle operator with the intuitive feel of steering the trailer 22 rather than steering the vehicle to achieve a desired trailer path. The system 24 obtains information pertaining to a relative orientation of the trailer 22 to the vehicle 20 from a rear-view camera 36. The relative orientation includes parameters such as a location of a hitch point 38 that is spaced a hitch length 44 from the vehicle rear axle 18. The system 24 also utilizes a trailer angle 40 and length 42. The trailer length 42 is a distance from the hitch point 38 to the trailer axle 25. In order to measure the relative angle 40 of the trailer 22 to the vehicle 20, fixed features of the trailer within the image captured by the camera 36 is selected. Changes in the position of the fixed features within the image correspond with changes in trailer angle and provide for the continuous updating of trailer position relative to the vehicle 20.

Figure 2:
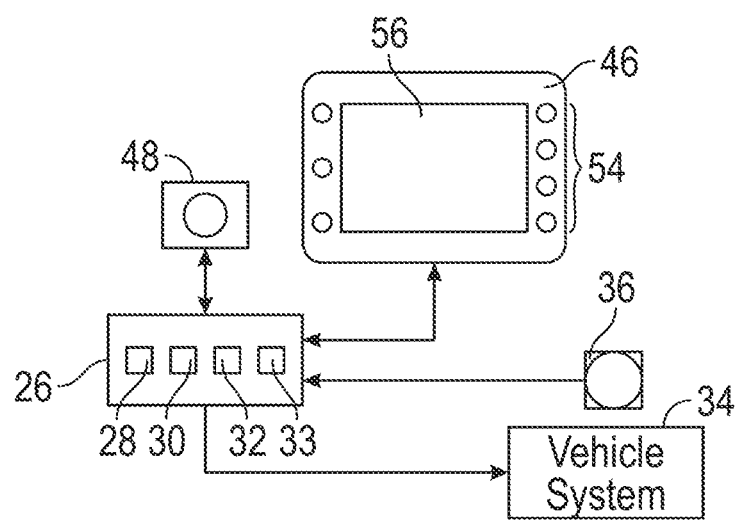
FIG. 2 is a schematic view of an example vehicle trailer assist system embodiment.

Referring to FIG. 2 with continued reference to FIG. 1, the example system 24 includes a controller 26 that is disposed within the vehicle 20. The controller 26 maybe a stand-alone controller for the system 24 and/or a part of a general vehicle controller 26. The controller 26 receives information from the camera 36 and uses that information to determine an orientation of the trailer 22. A knob 48 is operated by a vehicle operator within the vehicle cabin 50 to steer the trailer 22. A display 46 is supported within the vehicle cabin 50 that displays real time images when steering the trailer 22. The controller 26 directs operation of vehicle systems, such as the vehicle steering system, shown schematically at 34 to execute the desired steering of the trailer 22.

Figure 3:
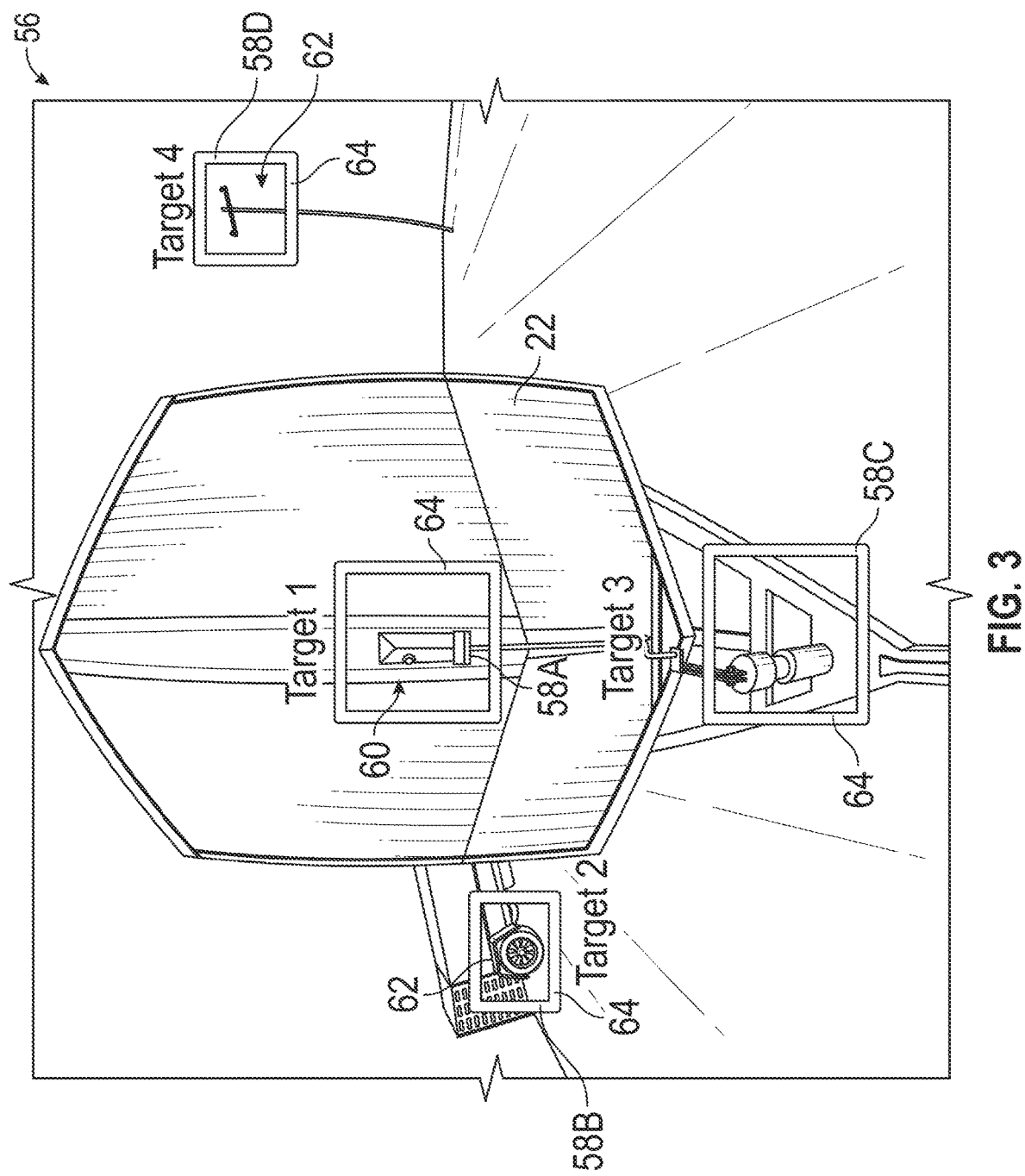
FIG. 3 is a schematic view of an example image including highlighted target areas.

Referring to FIG. 3 with continued reference to FIGS. 1 and 2, an example image 56 provided by the rear-view camera 36 is shown and shows different objects within the camera viewing range. The controller 26 may selected several target features to utilize in determination of the trailer position. As appreciated, the rear-view camera 36 will capture features that are both on the trailer 22 and that are part of the background. Moreover, the rear-view camera 36 may also capture a reflection 60 as shown at 58A that will not provide an accurate position of the trailer 22. Moreover, the rear-view camera 36 may capture background objects 62 that are not part of the trailer 22. The controller cannot easily determine what feature in the image is part of the trailer 22 and what feature is part of the background. The example system 24 provides for the vehicle operator to select which of the potential target areas 58A-D to utilize to determine trailer position.

In this disclosed example, the controller 26 generates boxes 64 on the image 56 around potential target features within target areas 58A-D. The vehicle operator selects which of the target areas should be utilized by the controller 26. The vehicle operator may select the specific target area by contacting a touch sensitive display and/or through manual actuation of switches of the display 46. In another disclosed embodiment, the vehicle operator may use a mobile device 52 that is in wireless communication with the vehicle 20 to select which of the target areas the controller will utilize to track trailer position.

Figure 4:
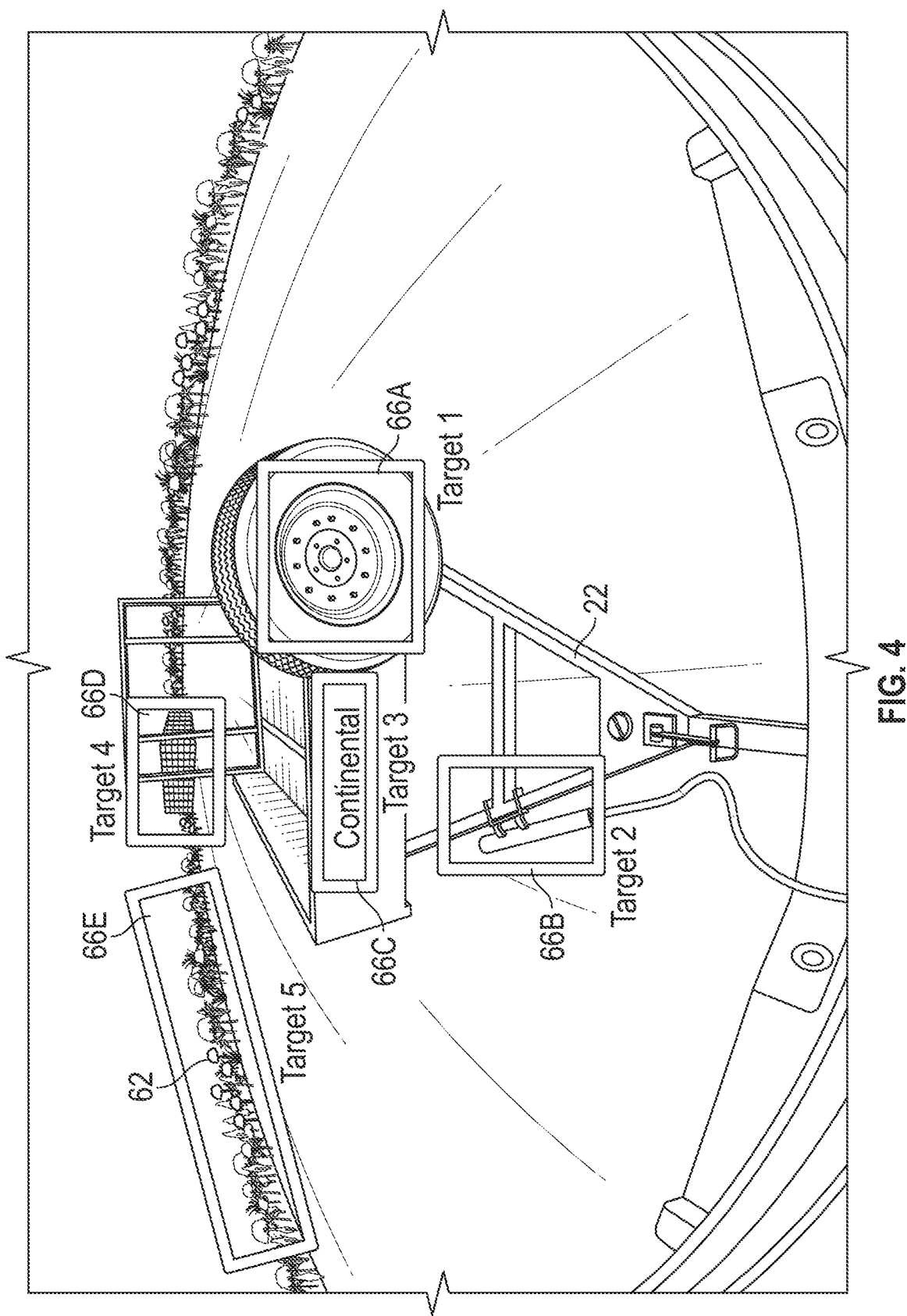
FIG. 4 is another schematic view of an example image including highlighted target areas.

Referring to FIG. 4, another example image is shown and includes potential target features within target areas 66A-E. The example potential target areas 66A-E include background objects and several different features on the trailer 22. The target features that is most suited for use by the controller is fixed and includes easily recognizable dimensions. In this example, the potential target areas include a spare tire 66A, a lift mechanism 66B, a sign 66C and a part of a tailgate 66D. In this example, the spare tire 66A would provide good target features for use in determining trailer position.

Figure 5:
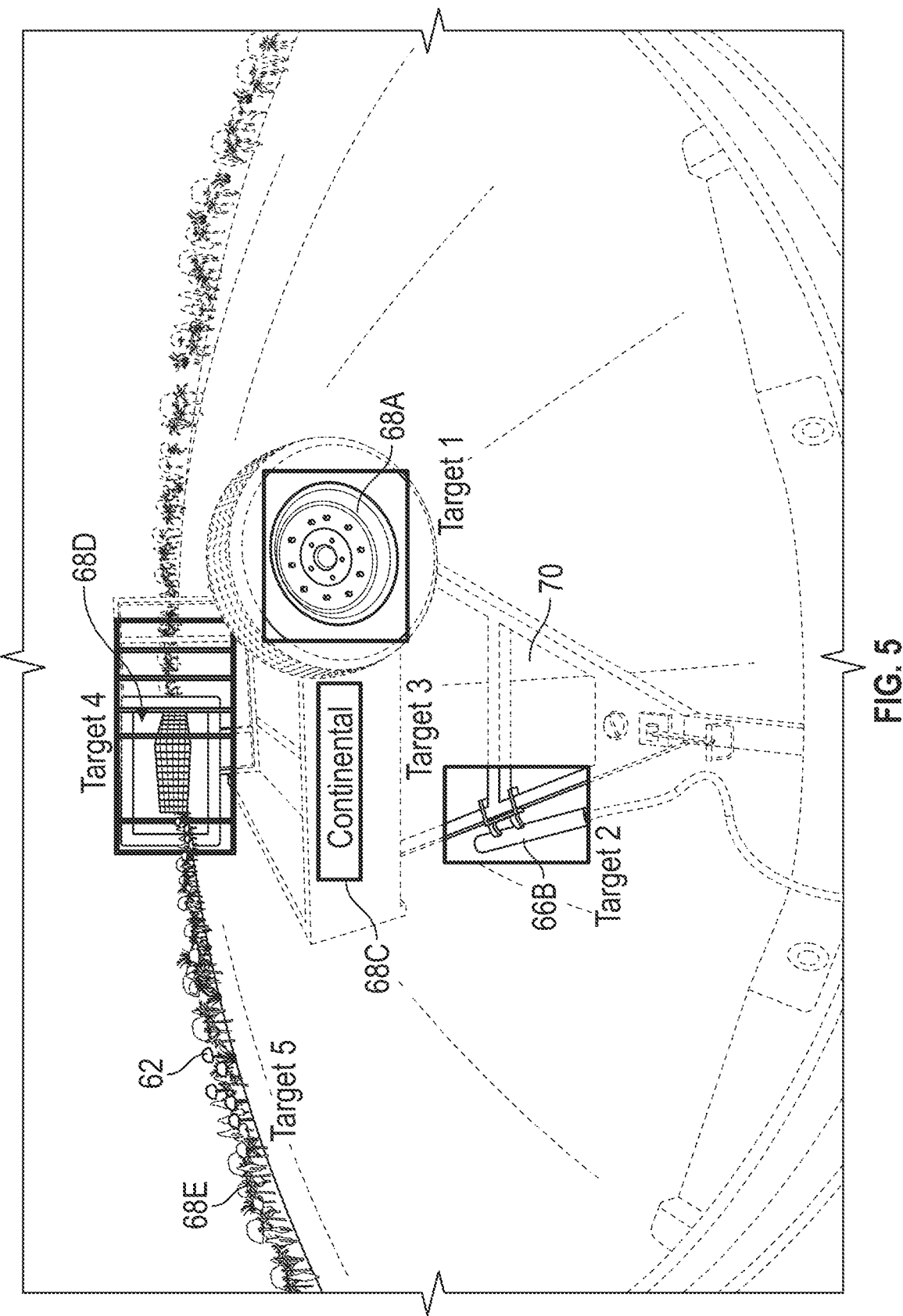
FIG. 5 is yet another schematic view of an example image including highlighted target areas.

Various methods of displaying the potential target features can be utilized and are within the contemplation of this disclosure. FIGS. 3 and 4 illustrate a display where the target area is outlined in a box generated on the display 46. FIG. 5 illustrates another means of showing the target areas 68A-E. In this example, the potential target areas 68A-E are shown clearly, and the remainder of the image is modified as a faded-out region 70. Such an image can make identifying the best target area easier for the vehicle operator.

Figure 6:
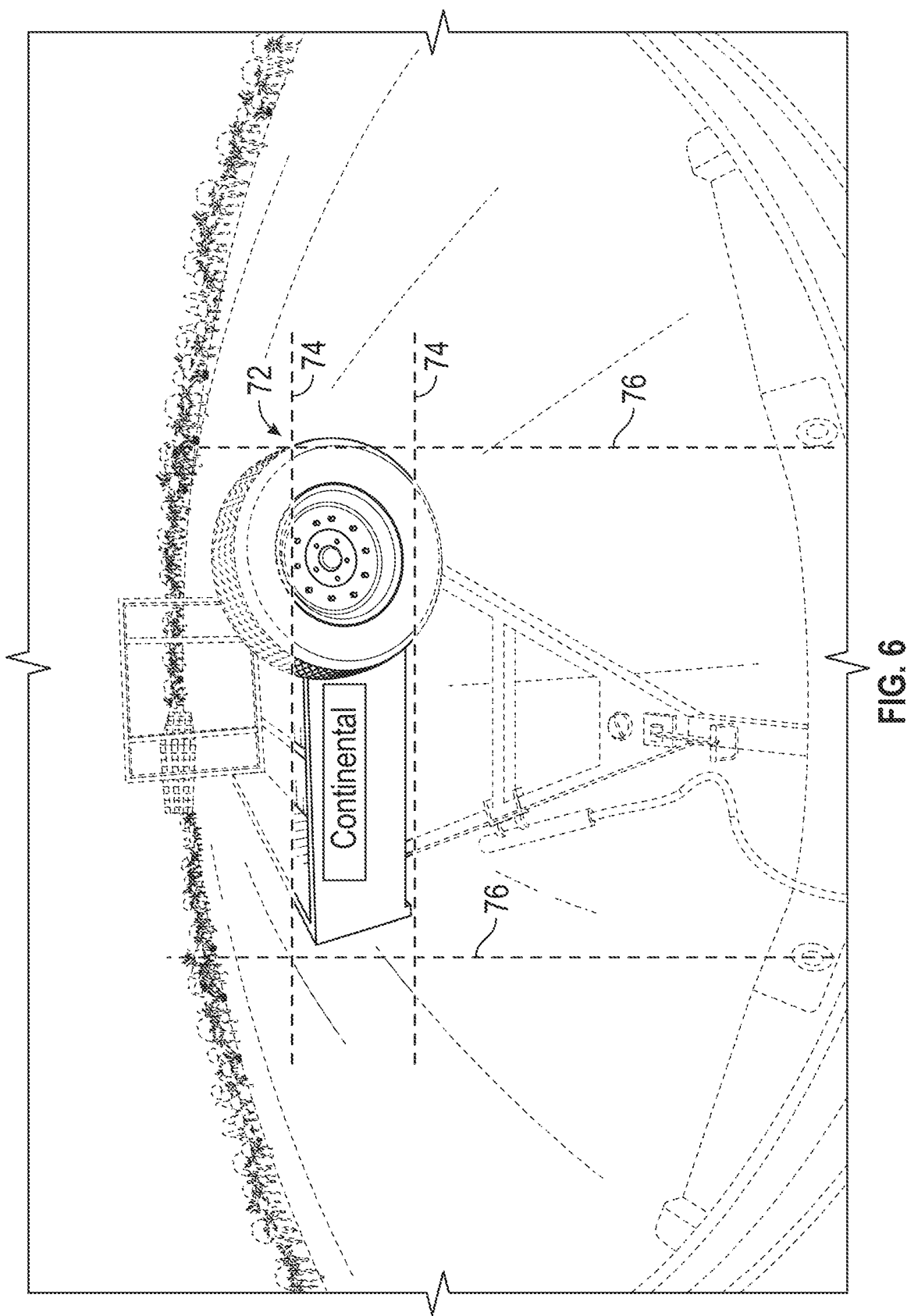
FIG. 6 is a schematic view of an image for selecting a target area.

Referring to FIG. 6, another disclosed means of selecting a target area includes manipulation of horizontal lines 74 and vertical lines 76 to box in the target features. The horizontal lines 74 and vertical lines are moved by the vehicle operator to form a box 72 around the desired target feature. The lines 74, 76 can be moved on the display 46 either by use of touch sensitive screen or by actuation of buttons 54.

Referring back to FIGS. 1 and 2, the controller 26 includes portions generating the images boxing the specific targets and selecting which target to utilize. The example controller 26 includes a first portion 28 configured to display a plurality of target areas to a vehicle operator. The controller 26 also includes a second portion 30 configured to record a vehicle operator selected one of the plurality of target areas. The controller further includes a third portion 32 configured to determine a relative orientation between a trailer and a tow vehicle based on a relative position between the selected target features on the trailer and the tow vehicle. Further portions and parts of the first, second and third portions 28, 30, and 32 are configured to recognize the target features in the image captured by the camera disposed on the tow vehicle and highlight the target areas on the display 46.

The highlighted areas provide for the selection of one of the highlighted target areas on the display 46.

The first, second and third portions 28, 30, 32 of the controller 26 can be portions of a processor or portions of software instructions executed by the processor. The processor may be a hardware device for executing software, particularly software stored in a memory portion 33. The processor can be a custom made or commercially available processor, a central processing unit (CPU), an auxiliary processor among several processors associated with the computing device, a semiconductor-based microprocessor (in the form of a microchip or chip set) or generally any device for executing software instructions.

The memory portion 33 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory. When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

The example system provides for selection of appropriate target features for use as reference point for the determination of a relative orientation between a trailer and a tow vehicle based. Selection by the vehicle operator can reduce improper selection of background objects without resorting to complex algorithms and image processing.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A vehicle trailer assist system comprising:
  a controller comprising at least one processor configured to display at least one image including a plurality of target areas on a display to a vehicle operator, the target areas being spaced from each other in the at least one image and the at least one image including a representation of a trailer, receive, from the display or at least one manually-actuatable control device associated with the display, a vehicle operator selection of one of the plurality of target areas, and determine a relative orientation between the trailer and a tow vehicle to which the trailer is coupled based on a relative position in the at least one image of the selected target area,
  wherein the controller is further configured to recognize the target features from the at least one image captured from a camera disposed on the tow vehicle, highlight the target areas on the display relative to the remainder of the at least one image not including the target areas, and provide for the vehicle operator selection of the one of the highlighted target areas on the display, and
  wherein on the display the target areas are highlighted by displaying the remainder of the at least one image not including the target areas as being faded out.

2. The vehicle trailer assist system as recited in claim 1, wherein the display is touch sensitive and the controller is configured to receive and record the selected one of the plurality of target areas responsive to the vehicle operator contacting the display at a location corresponding to the highlighted target area selected.

3. The vehicle trailer assist system as recited in claim 2, wherein the display is mounted within a cabin of the tow vehicle, and the display or the at least one manually actuatable control device is configured to cycle between the plurality of target areas shown on the display in response to manipulation of the display or the at least one actuatable control device by the vehicle operator when selecting the one of the plurality of target areas shown in the display.

4. The vehicle trailer assist system as recited in claim 1, wherein the display is actuatable by a vehicle operator to define a target box around target areas of the image displayed on the display and select the target area from the plurality of target areas to be within the defined target box.

5. The vehicle trailer assist system as recited in claim 1, wherein the controller is configured to identify potential target features from an image of the trailer and to highlight the identified target areas for selection by the vehicle operator.

6. The vehicle trailer assist system as recited in claim 1, wherein the highlight of the target features comprises a box disposed on the image visible on the display.

7. The vehicle trailer assist system as recited in claim 1, further comprising a camera and an actuator for steering the tow vehicle to maneuver the trailer, the camera configured to capture the at least one image and to communicate the at least one image to the display.

8. A method of operating a vehicle trailer assist system comprising:
  causing, by a controller comprising at least one processor, a display to display at least one image having a representation of a trailer and a plurality of target areas to a vehicle operator via a display, the target areas being spaced from each other in the at least one image and the at least one image including a representation of a trailer;

receiving, by the controller from the display or at least one manually-actuatable control device associated with the display, a vehicle operator selected one of the displayed plurality of target areas; and determining, by the controller, a relative orientation between the trailer and a tow vehicle based on a relative position of the selected target area in the at least one image, wherein the plurality of target areas on the display are highlighted prior to receiving the vehicle operator selected target area, for providing for selection of one of the target areas on the display, and wherein highlighting of the target areas comprises fading out the remainder of the at least one image.

9. The method as recited in claim 8, further comprising providing, by the controller, for selection of one of the target areas with a manually actuatable control device configured to cycle between the plurality of target areas shown in an image displayed on the display responsive to manipulation by the vehicle operator.

10. The method as recited in claim 9, further comprising providing, by the controller, for generation of a target box around a target area shown in the image displayed on the display and selection of the target area within the target box, comprising providing a pair of vertical lines and a pair of horizontal lines forming the target box on the display over the at least one image, and receiving indications from the display or the at least one manually-actuatable control device corresponding to vehicle operator initiated movement of the pair of vertical lines and the pair of horizontal lines to define the target box as the selected target area.

11. The vehicle trailer assist system of claim 1, wherein at least one of the plurality of target areas in the at least one image is on the representation of the trailer and at least one of the plurality of target areas in the at least one image is on a representation of a background object in the at least one image.

12. A controller for a vehicle trailer assist system, the controller comprising:

a first portion configured to cause a display to display at least one image having a plurality of target areas to a vehicle operator, the target areas being spaced from each other in the at least one image and the at least one image including a representation of a trailer;

a second portion configured to receive, from the display or at least one manually-actuatable control device associated with the display, a vehicle operator selection of one of the plurality of target areas; and a third portion configured to determine a relative orientation between the trailer and a tow vehicle to which the trailer is coupled based on a relative position in the at least one image of the selected target area, wherein the first portion is configured to highlight the plurality of target areas on the display relative to the remainder of the at least one image, and provide for selection of one of the highlighted target areas on the display, and wherein the target areas are highlighted by displaying the remainder of the at least one image as being faded out, and wherein each of the first portion, the second portion and the third portion comprising at least one of a processor portion or one or more software instructions executable by the at least one processor portion.

\* \* \* \* \*